Jan. 13, 1959  B. W. HALEY  2,868,062
OPTICAL DEVICE FOR TESTING ABSORPTION
Filed Dec. 3, 1956  4 Sheets-Sheet 1

Inventor:
Bernard W. Haley
By: Carl F. Peters
Attorney.

Jan. 13, 1959   B. W. HALEY   2,868,062
OPTICAL DEVICE FOR TESTING ABSORPTION
Filed Dec. 3, 1956   4 Sheets-Sheet 2

Inventor:
Bernard W. Haley
By: Carl F. Peters
Attorney

United States Patent Office 2,868,062
Patented Jan. 13, 1959

2,868,062

OPTICAL DEVICE FOR TESTING ABSORPTION

Bernard W. Haley, Berwyn, Ill., assignor to Hillside Laboratory, a corporation of Illinois Application December 3, 1956, Serial No. 625,764

5 Claims. (Cl. 88—14)

My invention relates to a device for testing the absorption rate of liquids when placed in contact with porous sheet materials. More particularly, my invention relates to a device useful in testing procedures carried out in control laboratories of paper and box board manufacturing plants as well as plants utilizing such products whereby the rate of absorption of various liquids into said materials can be predicted with great accuracy.

In the manufacture of paper or paper board it is highly desirable to be able to forecast the absorption rate or "receptivity" of various liquid materials such as ink, size, coatings, adhesives, etc. In order that standard controls may be established which will permit operational adjustments during manufacturing it is particularly desirable that tests on rates of absorption be obtained in less than one minute on paper stocks. In addition, it is highly desirable for the manufacturers of paper or paper board containers to be able to predict the rate of absorption of printing inks, adhesives and coatings during such manufacturing operations.

The devices which have been used heretofore in order to achieve the above testing procedures have been handicapped in that they are time consuming, non-automatic, and are subject to considerable error on the part of the technician conducting the tests.

It is the principal object of my invention to provide a testing device for measuring the absorption rates of liquids onto porous sheet materials which will eliminate the difficulties enumerated above.

It is a further object of my invention to provide a device which will obtain rapidly, usually in less than one minute, a numerical value of absorption rates onto porous sheet material such as paper and paper board.

It is a further object of my invention to provide a device which will measure the "receptivity" of paper and paper board for sizing, coatings, adhesives, inks, etc.; and which will forecast these rates of absorption in numerical values which can be translated into production practices.

These and other objects of my invention which will be apparent to those skilled in the art upon reading the disclosure in this specification are accomplished by a mechanism which I shall now exemplify in certain embodiments.

Reference is made to the accompanying drawings in which.

Briefly, I provide a device for measuring the absorption rates of liquids by porous sheet materials comprising the combination of an inclined ramp having a smooth uniform surface and a roller, preferably made of polished steel, which is positioned normally at the upper end of the ramp. There is further provided means for retaining the roller at the upper end of the ramp, said means being electrically energized to release the roller and permit it to roll down the ramp across the porous sheet material being tested. I further provide a source of illumination, such as a projection lamp, and means for focusing the light from the illumination source onto the ramp at a predetermined position between the upper and the lower ends of the ramp when the upper surface of the ramp is raised to a substantially vertical position. The beam of light is also focused on the sheet material at a predetermined angle and is then reflected in a straight beam through an iris diaphragm into a photoelectric means which in turn is connected to a recording device, such as a microammeter, to record the amount of the reflected light at any given time interval. After a zero setting of the device is made, as will be hereinafter discussed, a few drops of oil or other liquid are accurately placed upon the surface of the sheet positioned on the inclined ramp. The roller is released and passes over the oil spot to press the oil into the sheet material. The resulting film of oil is then placed in the path of the focused beam of light so that light is reflected from the oil film into the photoelectric cell. As the oil film gradually is absorbed by, and disappears below the surface of the sheet material, the light reflected into the photocell by the oil film is progressively decreased and the meter reading will be lowered in direct proportion to the loss of oil or other liquid from the sheet surface.

By the above method, penetration of the liquid into the sheet surface is measured while at the same time making available information as to the rate at which the liquid penetrates below the surface. Readings are taken at various time intervals and a plot can be made of the meter readings against time to provide information on the penetration of the liquid into the sheet. Total penetration is determined by the point at which the amount of reflected light becomes constant.

I have found that a single printed number can be used to represent the absorption function. It is useful to take ammeter readings at the end of 20 seconds, which reading can be used as the "printing number" of the sheet being tested. However, in testing some paper stocks it may be necessary to take readings at the end of 60 seconds.

Figure 1:
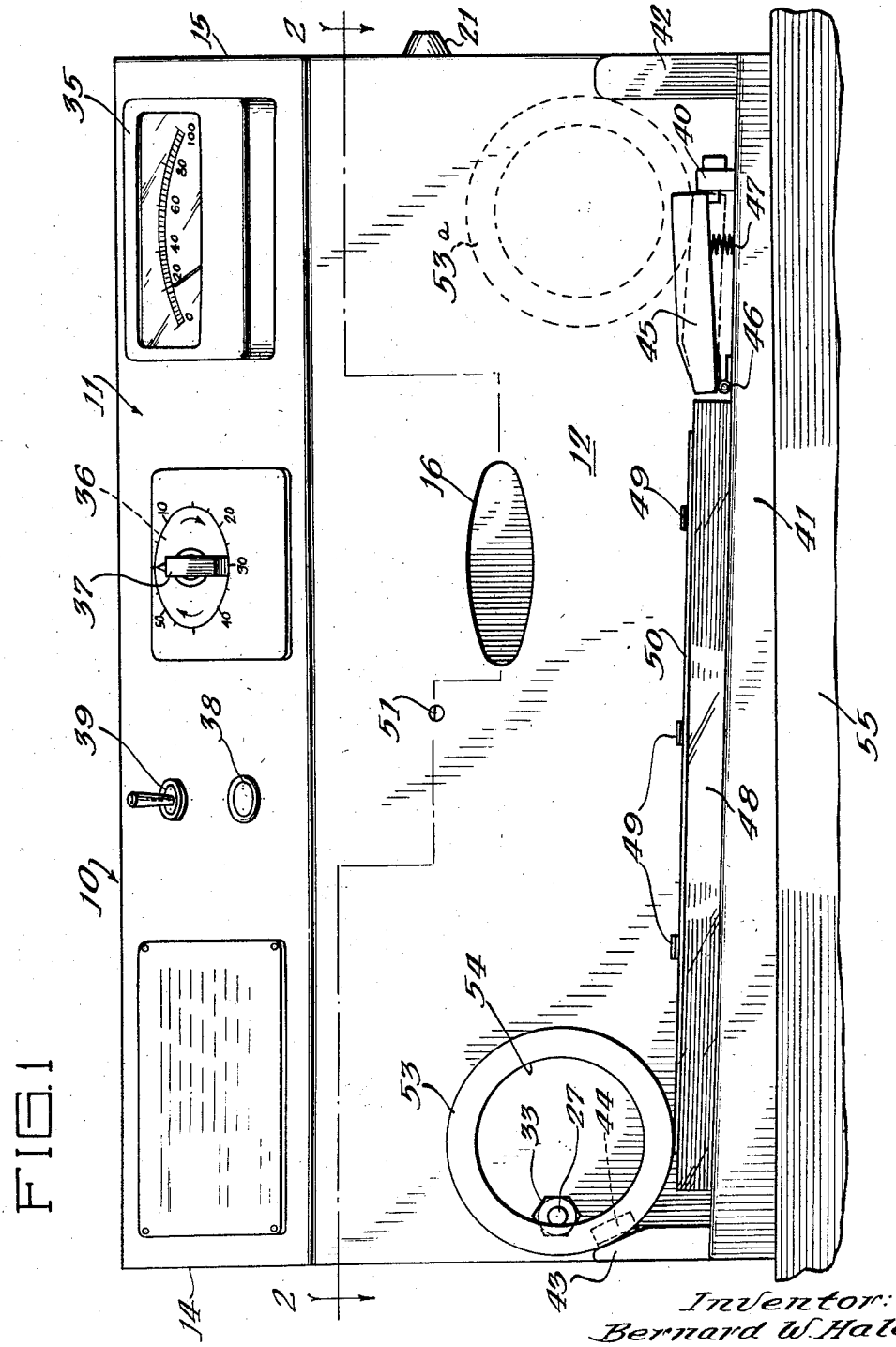
Figure 1 is a front elevation of my testing device.
Figure 2:
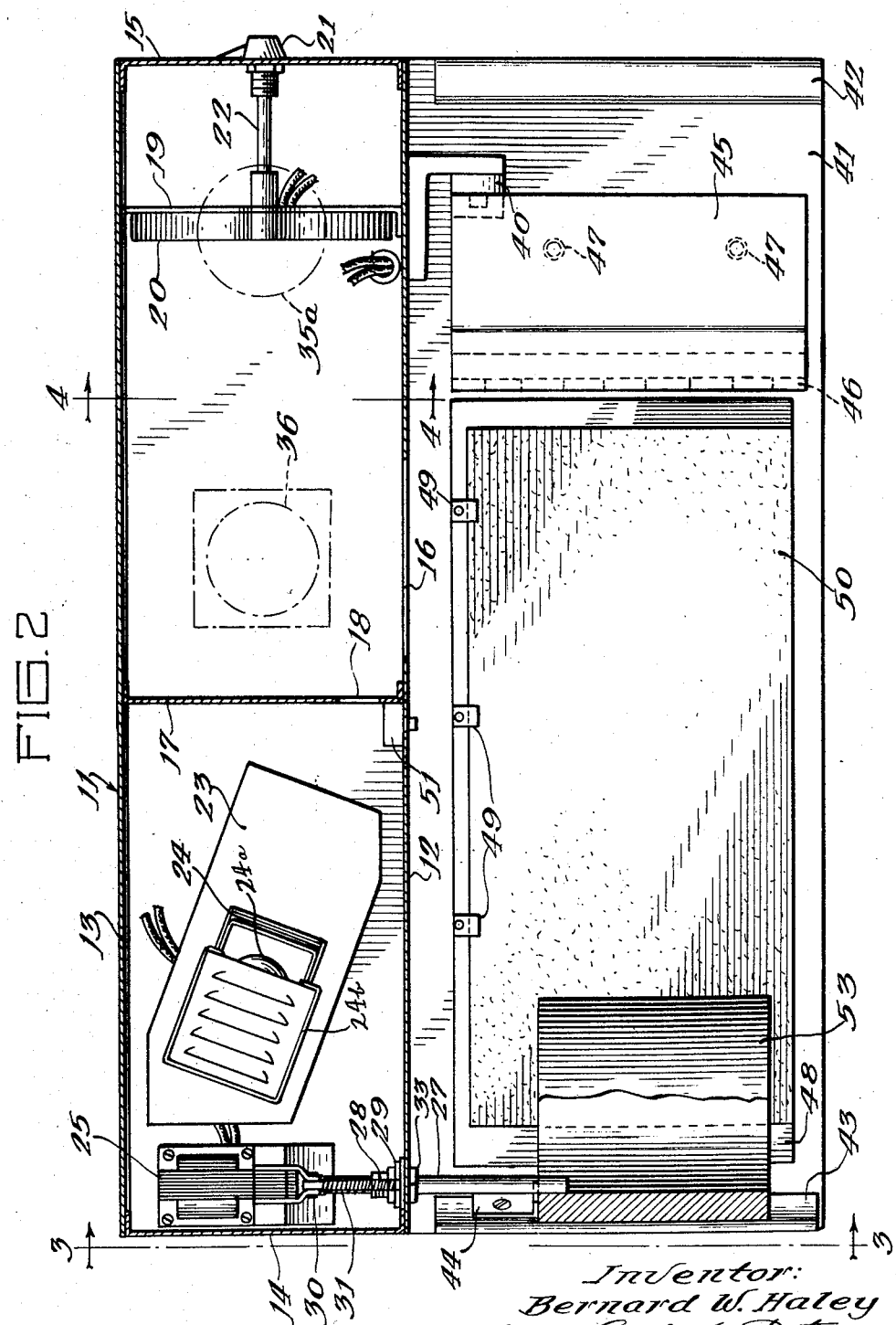
Figure 2 is a plan section taken along the line 2—2 of Figure 1.
Figure 3:
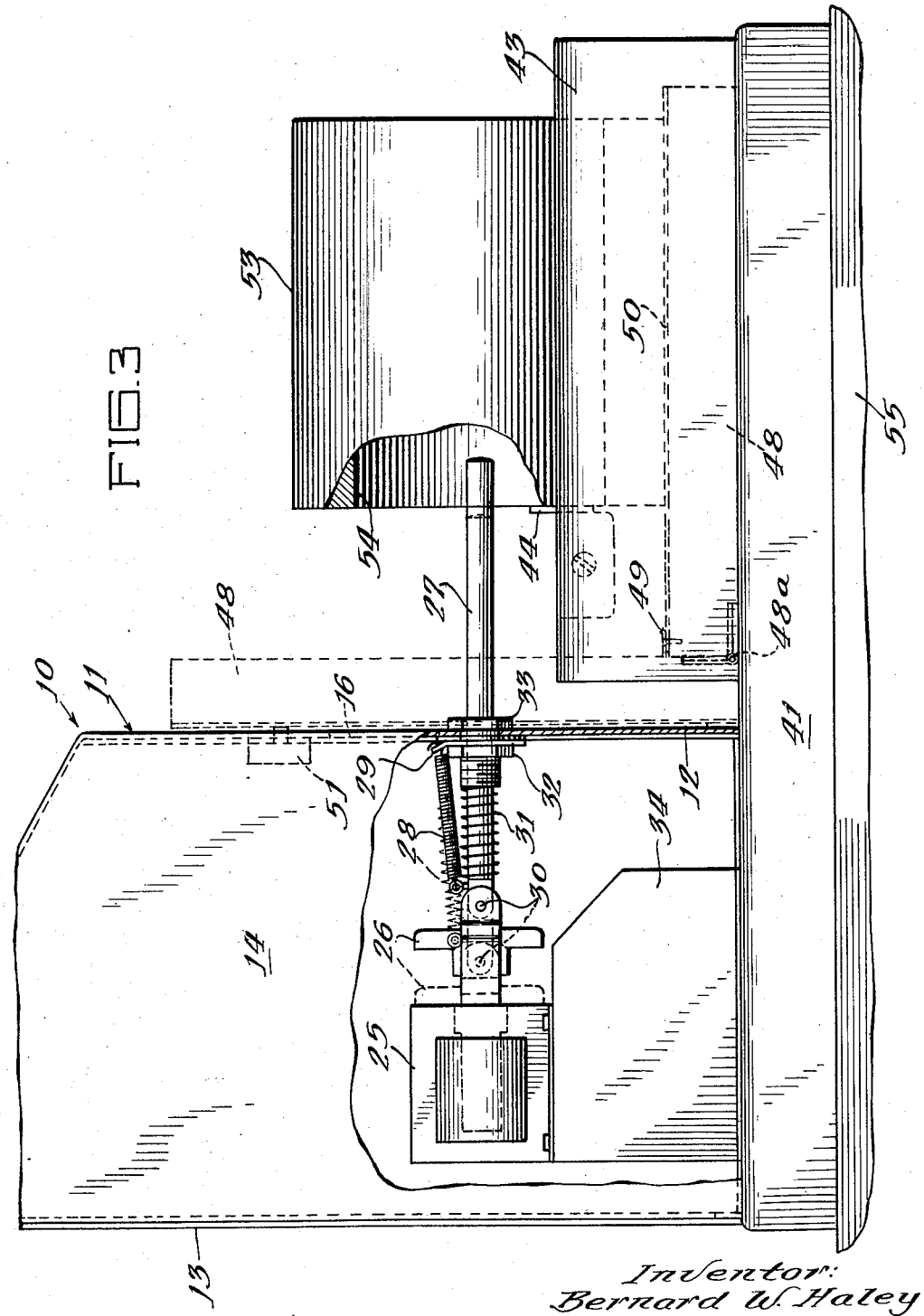
Figure 3 is an end elevation taken on the line 3—3 of Figure 2, with parts broken away.
Figure 4:
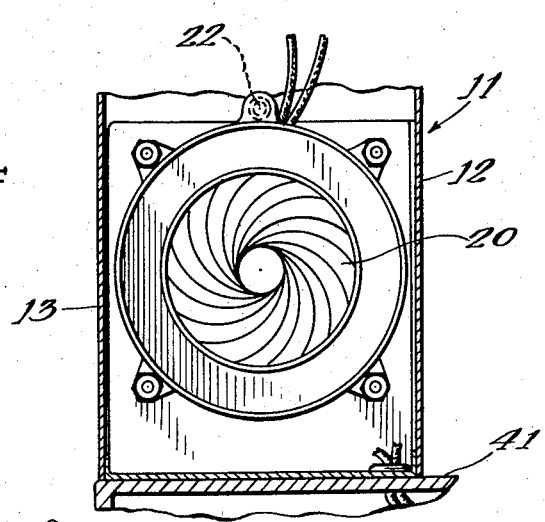
Figure 4 is a section taken along the line 4—4 of Figure 2.

Referring to Figures 1 and 2 of the drawings, I have shown the device 10 generally, consisting of a housing 11 having a front wall 12, end walls 14—15, and a back panel or door 13. In front of the housing 12, and affixed thereto, I provide a slanted member 41 which can be fabricated of wood or sheet metal, said slanted member being inclined from right to left. Superimposed on the slanted member 41 is a ramp or platen 48 having a smooth, uniform surface. Preferably the ramp 48 consists of a sheet of hard, shatter-resistant, smooth and uniformly-surfaced glass of the type sold under the trade mark "Carrara," which is cemented on a hard fiberboard backing. Ramp 48 is inclined at the same angle as the slanted member 41 and is affixed to the lower edge of the front wall 12 by means of hinges 48a. Along the upper longitudinal edge of the ramp 48 adjacent the front panel 12 are clips 49 which serve to retain the sample of porous sheet material 50 to be tested on ramp 48. At the upper end of ramp 48, and affixed to the slanted member 41 is a roller stop support 43 and a roller stop bracket 44. At the lower end of ramp 48 there is provided a roller stop 42, a member 45 of approximately the same width as the ramp 48 which is hinged to the slanted member 41 at position 46. There is further provided a roller 53 which is preferably, but not necessarily, hollow and having thick walls, which roller is usually manufactured from steel and has a highly polished surface which will bear upon the paper placed on the surface of ramp 48. When the testing device is ready for operation the roller 53 will be positioned at the upper end of ramp 48 as shown in Figures 1 and 2, and it will be retained in this position prior to operation of the testing device by means of a pin in the form of a sliding rod. This pin, when the device is in normal or non-operating condition, engages and retains the roller. The pin is supported, preferably slidably, in a bearing 33 retained on panel 12 by lock nut 32. The roller 53 is released by withdrawing the sliding pin 27 by means of an electrically energized solenoid 25 which is positioned inside housing 11. The solenoid-sliding pin arrangement is shown in more detail in Figure 3. When the solenoid 25 is energized electrically by closing push button switch 38, movable member 26 is drawn into the position indicated by the dotted line. Member 26 is connected to the sliding rod 27 by means of pins 30. When the solenoid is no longer energized by opening switch 38, member 26 is returned to normal position by a spring 28. Preferably a snubbing means such as spring 31 is provided which encloses the end of the sliding rod 27 within the housing 11 and which acts as a buffer when the sliding pin 27 is returned to normal position. The solenoid is fixed within the housing 11 by means of support 34 (details not shown).

Inside of housing 11 is a source of illumination such as a projection lamp 24a positioned in a housing 24b, the latter being secured by support 23. The illumination from the lamp 24a is passed through condenser lenses positioned at 24 (details not shown) and the resulting narrow light beam passes through opening 18 in partition 17 and then through an opening 16 in the front wall 12. The opening 16 is preferably, but not necessarily oval in configuration. Opposite the compartment enclosing the solenoid mechanism 25 and the lamp housing 24b, there is provided a closed compartment for receiving the light which is reflected from the paper sample 50, which is superimposed on the ramp 48, at the same angle as the incident beam strikes the paper. In the path of the beam of the reflected light is positioned a photoelectric means, such as a photocell 35a which measures the amount of light after it has passed through an iris diaphragm 20 positioned in housing 19 and generates a D. C. current which registers on microammeter 35. The diameter of the iris is periodically set manually by a shaft 22 which traverses the end wall 15 and is operated by a setting indicator 21.

When the roller 53 reaches the lower portion of the ramp 48, as shown at 53a, it strikes the hinged member 45 which is depressed and closes the micro switch 40 thereby setting in motion the timer 36 which is calibrated in seconds and is read at intervals according to the position of the timer indicator 37. The depressing of hinged member 45 is snubbed by springs 47 which also serve to return the member 45 to its normal position when the roller is returned to the upper end of the ramp.

Figure 5:
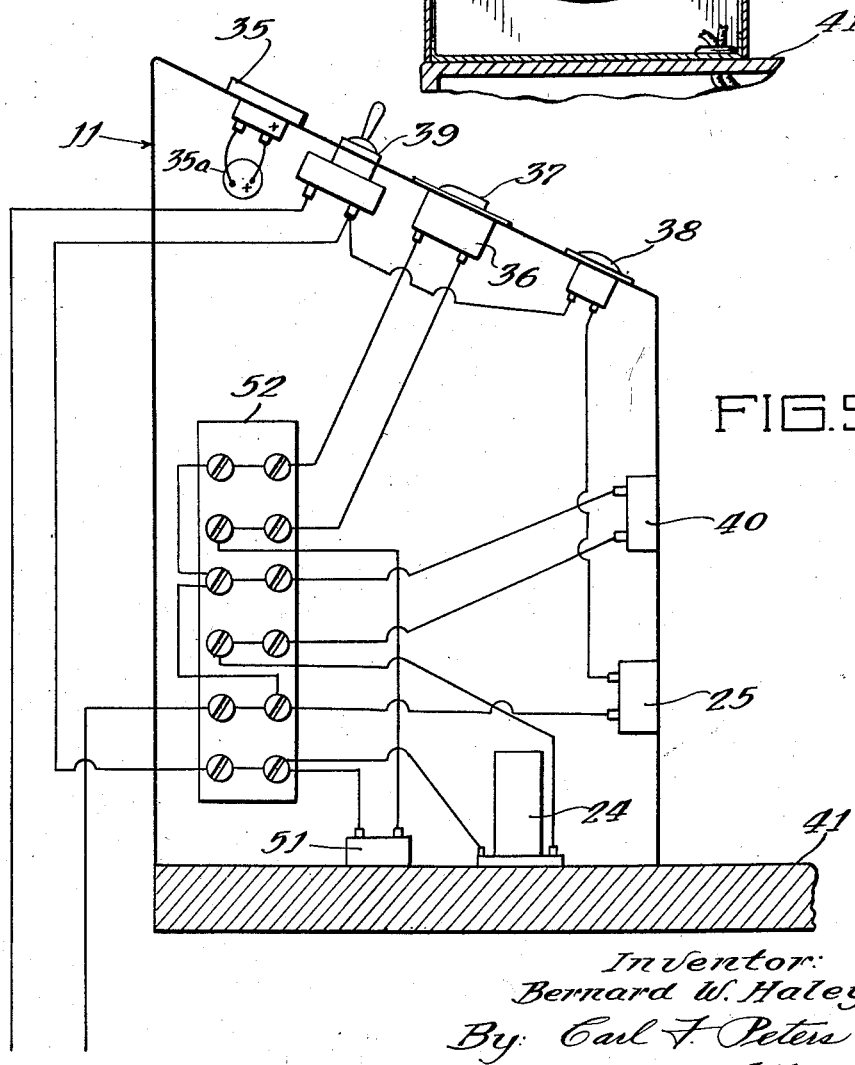
Figure 5 is a diagrammatic plan of the electrical circuit of my testing device.

The electrical circuit is shown schematically in Figure 5. The tester is designed for 115–230 volt A. C. 60 cycle current, and is ready to operate after closing toggle switch 39. The illuminating lamp 24a and photocell 35a circuits are closed by micro switch 51 which is tripped when the ramp 48 is elevated to a vertical position parallel to the front wall 12. The circuit for the solenoid 25 is closed by push button switch 38. The illuminating lamp 24a, the solenoid 25 and the timing mechanism 37 have circuits which are wired through terminal panel 52.

In operating the testing device which is the subject of this invention, it is first placed upon a table or a siutable support 55. The device must be levelled, such as by means of a carpenter's spirit level. A circular level (not shown) is ordinarily provided on the device. The surface of the ramp 48 is thoroughly cleaned and the ramp is then elevated into a vertical position thereby covering the opening 16 in the front panel 12. This trips the micro switch 51 which closes the lamp 24a circuit. The microammeter 35 is adjusted to a setting of 100 by means of knob 21. This setting should be checked at frequent intervals because the ramp is the standard for setting the machine.

A sample of porous sheet material, such as paper is then selected, cut to size and positioned on the ramp so that the grain of the paper runs lengthwise of the ramp. The ramp is then raised and preferably locked in a vertical position by means not shown. A reading is made where the microammeter needle comes to rest. The ramp 48 is then lowered and roller 53 is placed in position at the upper end of the ramp against roller stop 42. The solenoid release arm 27 is then positioned inside of the roller, in the case of a hollow roller. Alternatively, the roller may be solid and have an annular groove on its end face in which the release arm 27 may be positioned. Five drops of a standard oil or other liquid are then dropped on the paper at a point directly in line with the left hand side of the oval opening 16 and in the center line of the path of the roller. The roller is then released by pressing push button 38 which energizes the solenoid circuit. The solenoid retracts the release arm 27 and the roller proceeds down the ramp and strikes member 45 thereby closing microswitch 40 and starting timing mechanism 36. The ramp is then immediately raised to a vertical position. This operation trips the micro switch 51 and energizes the lamp 24a circuit. Microammeter readings are then taken at periodic intervals until the reading remains constant which indicates that total penetration of the paper has been achieved.

Modifications may, of course, be made on the testing device without departing from the spirit of the invention. It will be understood that other mechanical and electrical equivalents of the various components of the device may be employed, provided however that the solenoid release mechanism is a standard and essential part of the invention.

Having thus described my invention in certain exemplary embodiments, what I claim as new and desire to secure by patent is:

1. In a device for measuring the absorption rate of liquids by porous sheet materials, the combination comprising an inclined ramp having a smooth uniform upper surface, a roller positioned at the upper end of said inclined ramp and means for retaining said roller at the upper end of said ramp, electrically energized means for releasing said roller to permit it to roll down said ramp, means cooperating with said roller when it reaches the lower end of said ramp to energize a source of illumination and means for focusing a beam of light from said source onto the surface of said ramp at a point between the upper and lower ends of the ramp when the latter is raised to a substantially vertical position, means for raising said ramp to a substantially vertical position in order to intersect said focused light beam, photoelectric means positioned to receive light reflected from liquid-treated porous sheet material placed on the surface of said ramp, and means for recording the amount of reflected light at any given time interval.

2. A device according to claim 1 wherein the electrically energized roller release means comprises a pin which, in normal non-operating condition, engages and retains said roller at the upper end of said ramp, a support to slidably engage said pin, said pin being connected to a solenoid which, when electrically energized, disengages said pin from said roller.

3. A device according to claim 1 wherein the electrically energized roller release means comprises a pin slidably and substantially horizontally mounted in a bearing and which engages and retains said roller at the upper end of said ramp, means for connecting said pin to a solenoid which, when electrically energized, disengages said pin from said roller, and means for returning said pin to its normal position when the solenoid is no longer energized.

4. In a device for measuring the absorption rate of liquids by porous sheet material, the combination comprising an inclined ramp having a smooth, uniform upper surface a hollow thick-walled roller positioned at the upper end of said inclined ramp, a pin slidably and substantially horizontally mounted in a bearing and which engages said roller along the inner wall thereof in order to retain the roller at the upper end of the ramp, means for connecting said pin to a solenoid which, when electrically energized, disengages said pin from said roller, means for returning said pin to its normal position when the solenoid is no longer energized, means cooperating said roller when it reaches the lower end of said ramp to energize a source of illumination and means for focusing a beam of light from said source onto the surface of said ramp at a point between the upper and lower ends of the ramp when the latter is raised to a substantially vertical position, means for raising said ramp to a substantially vertical position in order to intersect said focused light beam, photoelectric means positioned to receive light reflected from liquid-treated porous sheet material placed on the surface of said ramp, and means for recording the amount of reflected light at any given time interval.

5. A device according to claim 4 including the provision of snubbing means to lessen the impact upon release of said engaging pin when the solenoid is no longer energized.

References Cited in the file of this patent

UNITED STATES PATENTS

| | | |
|---|---|---|
| 2,060,957 | Tarvin et al. | Nov. 17, 1936 |
| 2,253,356 | Akker | Aug. 19, 1941 |
| 2,353,852 | Rowland et al. | July 18, 1944 |
| 2,545,281 | Hunt | Mar. 13, 1951 |